INVENTOR.
James W. Jacobs
BY R. R. Candor
His Attorney

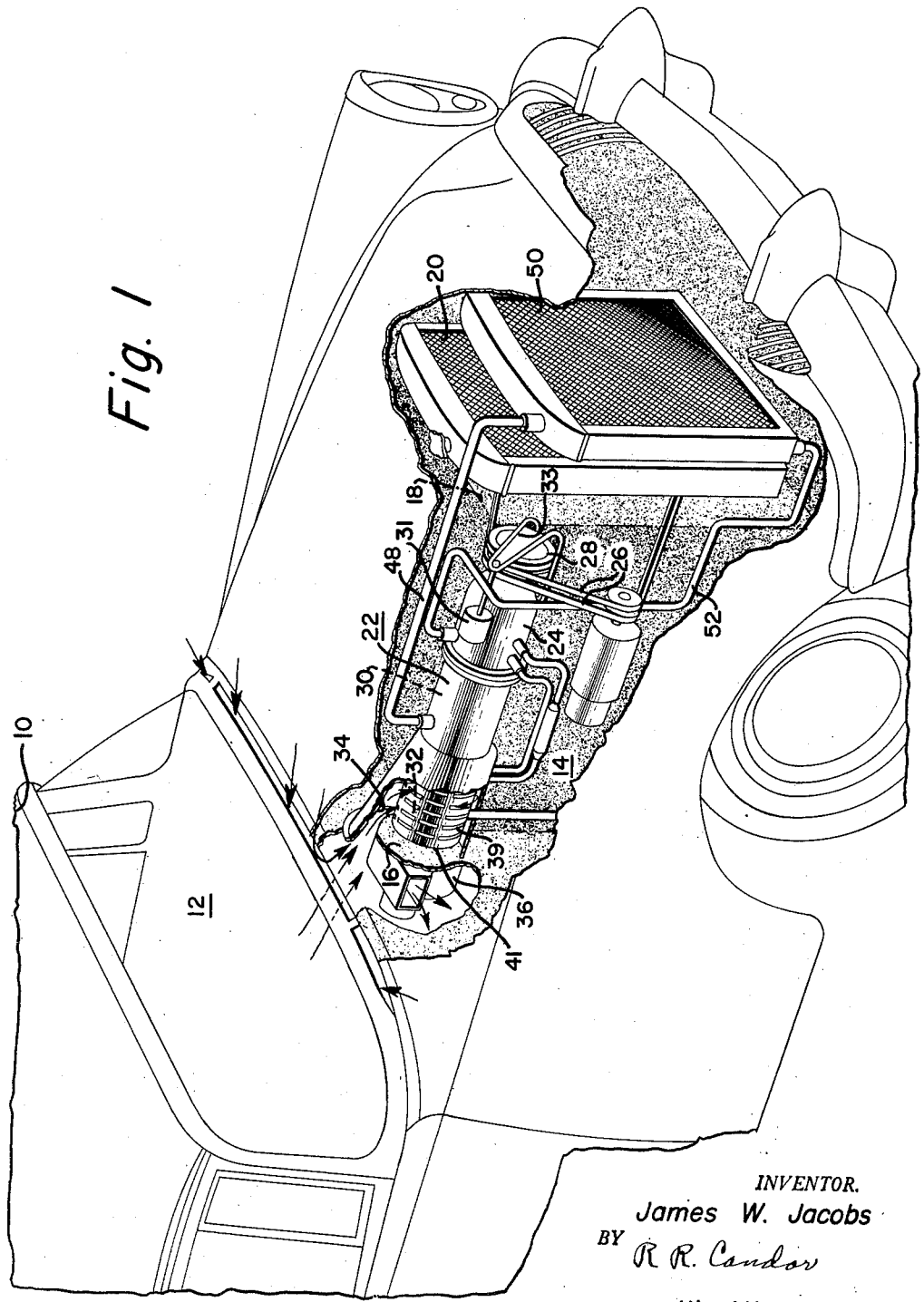
Sept. 17, 1957  J. W. JACOBS  2,806,358
VEHICLE REFRIGERATING APPARATUS
Filed June 8, 1954  3 Sheets-Sheet 1
INVENTOR.
James W. Jacobs
BY R. R. Candor
His Attorney Sept. 17, 1957   J. W. JACOBS   2,806,358
VEHICLE REFRIGERATING APPARATUS
Filed June 8, 1954   3 Sheets-Sheet 2
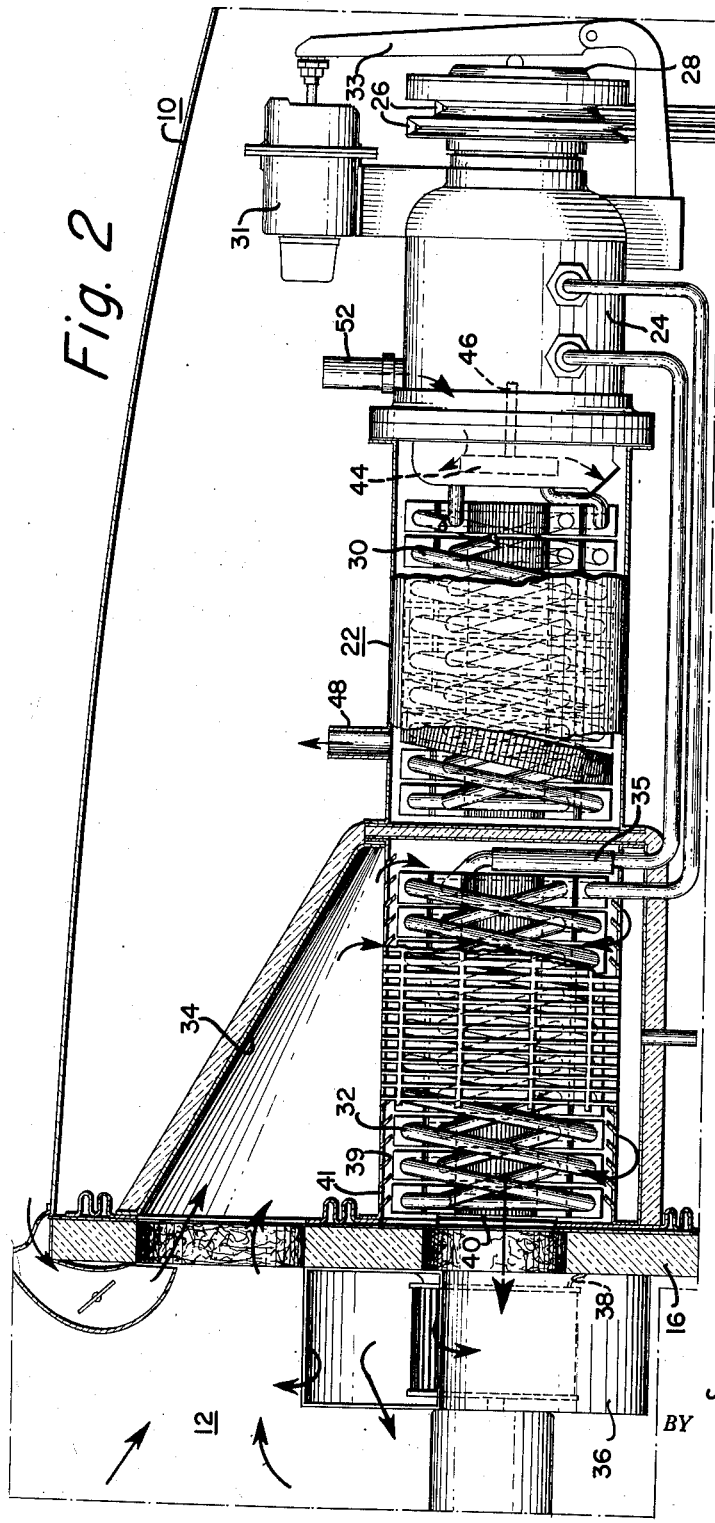
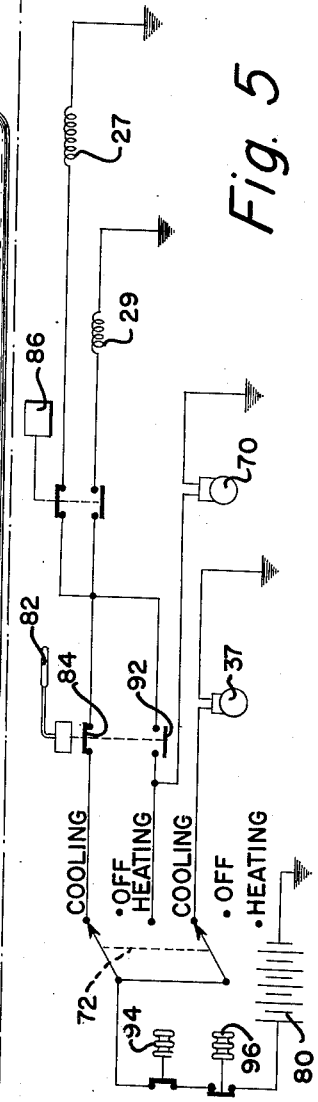
INVENTOR.
James W. Jacobs
BY R. R. Candor
His Attorney Sept. 17, 1957 J. W. JACOBS 2,806,358
VEHICLE REFRIGERATING APPARATUS
Filed June 8, 1954 3 Sheets-Sheet 3

United States Patent Office 2,806,358
Patented Sept. 17, 1957

2,806,358
VEHICLE REFRIGERATING APPARATUS

James W. Jacobs, Dayton, Ohio, assignor to General Motors Corporation, Detroit, Mich., a corporation of Delaware Application June 8, 1954, Serial No. 435,108

4 Claims. (Cl. 62—117.1)

This invention relates to refrigerating apparatus and more particularly to an automobile air conditioning system.

One of the objects of this invention is to provide a self-contained air conditioning unit which may be mounted as a unit in the engine compartment of the car.

Still another object of this invention is to provide a self-contained air conditioning unit which may be fully assembled and charged with refrigerant at the factory and thereafter installed by any garage mechanic much like any other automobile accessory.

A further object of this invention is to provide an air conditioning unit in which heat removed from the passenger compartment of the car is dissipated into a refrigerant condenser which is cooled by fluid circulating through an auxiliary radiator or the main engine radiator along with the engine cooling fluid.

Still another object of this invention is to provide an air conditioning unit which is small and compact and in which the cycle may be reversed so as to either heat or cool the air for the passenger compartment of the car.

Still another object of this invention is to provide an improved control arrangement for an automobile air conditioning system.

Further objects and advantages of the present invention will be apparent from the following description, reference being had to the accompanying drawings, wherein a preferred form of the present invention is clearly shown.

In the drawings:

Figure 1 is a perspective view somewhat schematic and with parts broken away showing the construction and arrangement of one form of the air conditioning unit within the engine compartment of the car;

Figure 2 is a side elevational view with parts broken away showing the construction and arrangement of one form of the refrigeration apparatus;

Figure 5 is a schematic wiring diagram showing the controls for the air conditioning equipment; and, Figure 6 is a schematic view showing a modified form of the invention.

Figure 3:
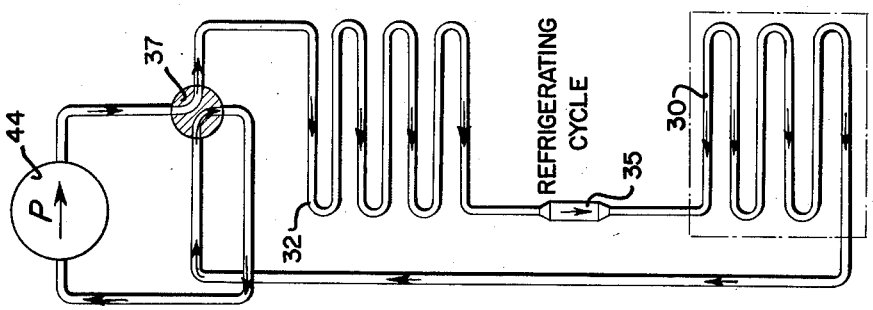
Figure 3 is a schematic view showing the refrigerant circuit during the cooling cycle.

Referring now to the drawings wherein the invention has been shown, reference numeral 10 designates a passenger automobile having a passenger compartment 12 and an engine compartment 14 separated from the passenger compartment by means of a dashboard or fire wall 16. The main car engine has been designated by the reference numeral 18 and is intended to designate the conventional type of car engine used for propelling the vehicle. The engine is of the watercooled type and includes the usual engine radiator 20 which is mounted directly in front of the car engine so as to be cooled by the outside air which enters the front end of the engine compartment in accordance with standard practice. The engine radiator 20 is made large enough so as to have enough capacity to not only dissipate the waste heat, but also to dissipate heat of condensation from the refrigeration system for a purpose to be explained more fully hereinafter.

The air conditioning equipment comprises a self-contained unit generally designated by the reference numeral 22. The unit 22 is so constructed and arranged that it may be installed merely by lowering it into the engine compartment of the car alongside the main car engine 18 as shown in Figure 1 of the drawing. The unit 22 consists of a compressor 24 which is adapted to be driven from the main car engine by means of belts 26 and a clutch 28. The clutch is preferably of the type shown in my copending application Serial No. 373,853, filed August 12, 1953. Since the construction of the clutch may be varied without departing from the spirit of my invention and since clutches are broadly old, the clutch construction need not be described in detail. The clutch operating mechanism includes a pair of solenoid coils 27 and 29 which when energized provide for low and high speed operation respectively as will be explained more fully hereinafter. The coils 27 and 29 are housed in a casing 31 and operate the clutch proper through lever means 33 as explained in my copending application.

The unit 22 in substance consists of three main elements, the compressor 24, a first liquid to refrigerant heat exchange unit 30 located directly behind the compressor 24, a restrictor 35, and a second air to refrigerant heat exchange unit 32 located directly behind the unit 30. When the refrigeration apparatus is used for cooling the air for the passenger compartment of the car, the heat exchange unit 30 functions as a condenser and the heat exchange unit 32 functions as an evaporator. A reversing valve 37 (see Figures 3 and 4) is provided in the circuit as shown for reversing the cycle. For convenience of description, the units 30 and 32 will be referred to as condenser and evaporator units respectively except as otherwise noted. Air to be conditioned enters the unit 22 through a passage 34 which serves to convey the air to be conditioned radially inwardly through slots 39 in the air directing shroud 41 which surrounds the evaporator 32. The air flowing over the evaporator is picked up by a fan or blower unit 36 which is supported on the dashboard within the passenger compartment of the car with its inlet 38 arranged in alignment with the outlet opening 40 provided in the end wall of the evaporator assembly. The blower 36 serves to discharge the conditioned air into suitable air distributing ducts and nozzles (not shown) which may be of any suitable construction but are preferably of the type shown in copending application Serial No. 430,890, filed on May, 19, 1954, now Patent No. 2,774,222, granted December 18, 1956 (F–695), in the names of James W. Jacobs and Daniel J. Barbulesco.

Figure 6:
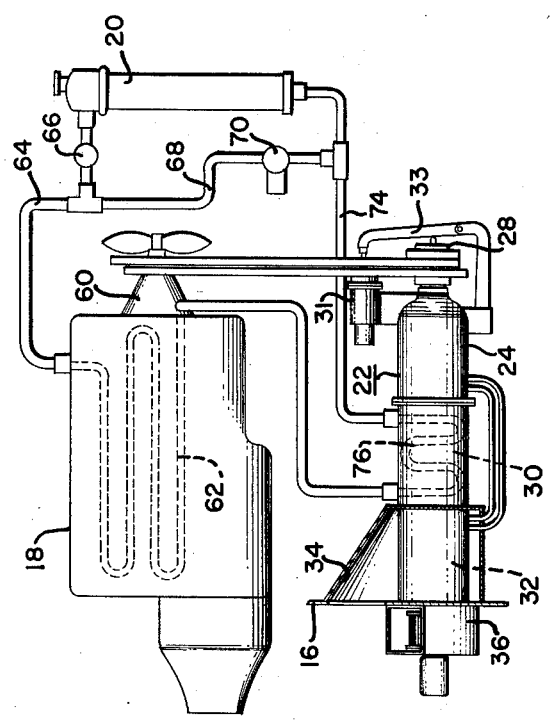

The liquid for cooling the condenser may be circulated through an auxiliary radiator 50 as shown in Figure 1 or may be circulated through the main engine radiator as shown in Figure 6. The condenser cooling system of Figure 1 is best suited for use in an ordinary refrigeration system whereas the arrangement shown in Figure 6 is best suited for a reverse cycle type of refrigeration system as will be explained more fully hereinafter.

The liquid used for transferring heat to and from the heat exchange unit 30 of Figure 1 is circulated through the heat exchange unit 30 by means of a water pump 44 which is preferably mounted on the one end of the compressor 24 as shown so as to be driven by the main compressor shaft 46. The liquid circulated by the pump is discharged out through an outlet line 48 which leads to the auxiliary radiator 50 located directly in front of the engine radiator 20. The outlet of the radiator 50 is connected to a conduit 52 which returns the fluid to the heat exchange unit 30.

Figure 6 of the drawing shows a modified liquid circulating system for use in transferring heat to and from the heat exchange unit 30. In this arrangement, liquid from the engine cooling system is caused to flow in thermal exchange relationship with the heat exchange unit 30 so as to cool the same when the refrigerating system is used to cool air for the passenger compartment of the car. Except as otherwise indicated, the system shown in Figures 1 and 2 is the same as the system shown in Figure 6, the main difference being in the water circulating part of the system.

When the air conditioning unit is used for heating air for the passenger compartment of the car, the heat exchange unit 32 serves as the condenser and the heat exchange unit 30 serves as an evaporator which refrigerates the liquid flowing through the main engine cooling circuit. As shown in Figure 6 of the drawing, the engine 18 is provided with the usual water pump 60 which forcefully circulates cooling liquid such as water or a mixture of water and ethylene glycol or the equivalent through the cooling passages 62 in the main engine block where the liquid picks up waste engine heat. The liquid thus heated is discharged through a line 64 leading to the usual car engine radiator 20. The usual control thermostat 66 is located in line 64 so as to shut off the flow of water to the radiator at water temperatures below a predetermined value such as 180° F. A by-pass line 68 is provided in which there is located a solenoid operated valve 70 which is open at all times when the air conditioning system is used for heating the passenger compartment. (The valve 70 is adapted to be deenergized so as to be closed at all times when the air conditioning selector switch 72 shown in Figure 5 is moved to the cooling position as will be explained more fully hereinafter.) The liquid leaving the radiator 20 or the by-pass line 68 flows through the line 74 which directs the liquid into thermal exchange relationship with the heat exchange unit 30. In actual practice the liquid flowing through the line 74 is directed into the housing which surrounds the heat exchange unit 30 and fills the space surrounding the finned coils which form the core of the heat exchange unit and through which the refrigerant flows. The reference numeral 76 is used to designate the liquid path which has been schematically shown in Figure 6 as a serpentine coil merely for purposes of illustration.

When the air conditioning unit is used for heating the air in the passenger compartment of the car, the valve 70 will be opened so that the liquid leaving the engine cooling chambers is free to by-pass the radiators 20 when the thermostatic valve 66 closes. The waste engine heat then flows in thermal exchange relationship with the heat exchange unit 30 which then functions as an evaporator and gives up its heat to the evaporating refrigerant whereby the engine cooling liquid leaving the heat exchange unit 30 is refrigerated before returning to the main engine block.

As shown in Figure 5 of the drawing, the current for operating the air conditioning controls is supplied by a storage battery 80 which represents the usual car battery. A manual switch 72 is adapted to be set to select either air cooling or heating or to turn off the air conditioning equipment. When the switch 72 is in the position in which it is shown in Figure 5 of the drawing, the cooling equipment will be turned on provided the thermostat 82 which is preferably located in the passenger compartment of the car indicates that cooling is required. The thermostat 82 is adapted to control a switch 84 which in turn controls the operation of the clutch. As set forth hereinabove, the clutch is preferably of the two-speed type and includes a speed responsive device 86 which energizes the clutch operating solenoid 27 at high engine speeds so as to reduce the speed of the compressor relative to the speed of the engine. At low engine speeds the speed responsive device 86 opens the circuit to the solenoid 27 and closes the circuit to the solenoid 29 so as to increase the speed of the compressor relative to the speed of the engine. It will also be noted that the switch 72 serves to open a circuit to the by-pass valve 70 so as to prevent the flow of engine cooling water through the by-pass when the system is used for cooling the passenger compartment of the car.

Upon moving the switch 72 into the heating position, the by-pass valve 70 will be energized so as to permit the flow of engine cooling liquid through the by-pass line 68 when the thermostat 66 closes off the flow to the main radiator. When the switch 72 is in the heating position, the operation of the compressor clutch is controlled by the switch 92 which in turn is controlled by the thermostat 82. The arrangement is such that when the temperature in the passenger compartment falls below a predetermined value the thermostat 82 will cause the switch 92 to close and thereby initiate operation of the compressor. Movement of the switch 72 into the heating position also causes the circuit to be opened through the refrigerant cycle reversing valve 37. Deenergization of this valve 37 serves to reverse the functions of the heat exchange units 30 and 32 so that the heat exchange unit which served as an evaporator during the cooling cycle now becomes the condenser for heating the air and the heat exchange unit which served as a condenser becomes the evaporator which then refrigerates the liquid used for cooling the engine as explained more fully hereinabove.

Figure 4:
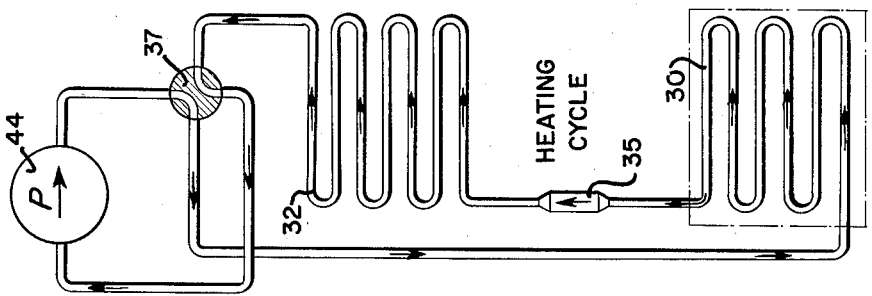
Figure 4 is a view similar to Figure 3 but showing the refrigerant circuit during the heating cycle.

The reverse cycle valve 37 is shown in Figures 3 and 4 but is not visible in Figures 1, 2 and 6 as it is incorporated within the compressor housing. The location of the reverse cycle valve is broadly immaterial. Reference numerals 94 and 96 designate the usual low and high pressure cut out switches.

In accordance with the provisions of Rule 78a, reference is made to the following additional prior filed applications: Serial No. 376,606, filed August 26, 1953, now Patent No. 2,747,385, granted May 29, 1956, and Serial No. 365,593, filed July 2, 1953.

While the form of embodiment of the invention as herein disclosed constitutes a preferred form, it is to be understood that other forms might be adopted, as may come within the scope of the claims which follow.

What is claimed is as follows:

1. In combination, an automobile having a passenger compartment and an engine compartment separated by a wall, an engine within said engine compartment for propelling said vehicle, a refrigerating system disposed wholly within said engine compartment and comprising a compressor, a condenser, an evaporator, and refrigerant flow means for connecting said evaporator, compressor and condenser in refrigerant flow relationship, torque transmitting means between said compressor and said engine, housing means for enclosing said compressor, condenser and evaporator, said housing means having its one end arranged adjacent said wall and connected thereto, said wall having opening means through which air cooled by said evaporator is discharged into said passenger compartment.

2. In combination, an automobile having a passenger compartment and an engine compartment separated from one another by a wall having an air passage therein, an engine within said engine compartment for propelling said vehicle, a refrigerating system disposed wholly within said engine compartment and comprising a compressor, a condenser, an evaporator, and refrigerant flow means for connecting said evaporator, compressor and condenser in refrigerant flow relationship, torque transmitting means between said compressor and said engine, housing means for enclosing said compressor, condenser and evaporator, said housing means having its one end provided with an opening arranged adjacent said air passage, and blower means for circulating air to be conditioned for said passenger compartment in thermal exchange relationship with said evaporator, said blower means being mounted on said wall in said passenger compartment.

3. In combination, an automobile having a passenger compartment and an engine compartment separated by a wall, an engine within said engine compartment for propelling said vehicle, a refrigerating system disposed wholly within said engine compartment and comprising a compressor, a condenser, an evaporator, and refrigerant flow connections for connecting said evaporator, compressor and condenser in refrigerant flow relationship, torque transmitting means comprising a variable speed ratio drive between said compressor and said engine, housing means for enclosing said compressor, condenser and evaporator, said housing means having its one end arranged adjacent said wall, said wall having opening means through which air cooled by said evaporator is discharged into said passenger compartment.

4. In combination, an automobile having a passenger compartment, an engine compartment, a wall separating said passenger compartment from said engine compartment, an engine within said engine compartment for propelling said vehicle, a refrigerating system disposed wholly within said engine compartment and comprising a compressor, a condenser, an evaporator, and refrigerant flow means for connecting said evaporator, compressor and condenser in refrigerant flow relationship, torque transmitting means between said compressor and said engine, housing means for enclosing said compressor, condenser and evaporator, said housing means having its one end arranged adjacent said wall, said wall having opening means through which air cooled by said evaporator is discharged into said passenger compartment, and means for reversing the flow of refrigerant through said evaporator and said condenser so as to reverse the functions of said evaporator and said condenser.

References Cited in the file of this patent

UNITED STATES PATENTS

| | | |
|---|---|---|
| 2,078,804 | McConkey | Apr. 27, 1937 |
| 2,264,848 | Kahl | Dec. 2, 1941 |
| 2,287,172 | Harrison | June 23, 1942 |
| 2,311,224 | Gould | Feb. 16, 1943 |
| 2,344,864 | Griswold | Mar. 21, 1944 |
| 2,455,421 | Kirkpatrick | Dec. 7, 1948 |
| 2,475,897 | Iwanski | July 12, 1949 |
| 2,638,752 | Mendez | May 19, 1953 |
| 2,729,951 | Wyckoff et al. | Jan. 10, 1956 |